(12) United States Patent
Madhavaraj et al.

(10) Patent No.: US 10,490,182 B1
(45) Date of Patent: Nov. 26, 2019

(54) INITIALIZING AND LEARNING RATE ADJUSTMENT FOR RECTIFIER LINEAR UNIT BASED ARTIFICIAL NEURAL NETWORKS

(71) Applicant: Amazon Technologies, Inc., Seattle, WA (US)

(72) Inventors: Ayyavu Madhavaraj, Bangalore (IN); Sri Venkata Surya Siva Rama Krishna Garimella, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/393,972

(22) Filed: Dec. 29, 2016

(51) Int. Cl.
| | | |
|---|---|---|
| *G10L 15/16* | (2006.01) | |
| *G10L 15/06* | (2013.01) | |
| *G10L 25/30* | (2013.01) | |
| *G10L 15/183* | (2013.01) | |
| *G10L 15/22* | (2006.01) | |
| *G10L 15/14* | (2006.01) | |
| *G06N 7/02* | (2006.01) | |
| *G06N 3/08* | (2006.01) | |

(52) U.S. Cl.
CPC .......... *G10L 15/063* (2013.01); *G10L 15/142* (2013.01); *G10L 15/16* (2013.01); *G10L 15/183* (2013.01); *G10L 15/22* (2013.01); *G10L 25/30* (2013.01); *G06N 3/08* (2013.01); *G06N 7/023* (2013.01); *G10L 2015/223* (2013.01)

(58) Field of Classification Search
USPC ........................................................ 704/232
See application file for complete search history.

(56) References Cited

U.S. PATENT DOCUMENTS

| | | | |
|---|---|---|---|
| 2015/0161988 A1* | 6/2015 | Dognin | G10L 15/063 704/232 |
| 2017/0061328 A1* | 3/2017 | Majumdar | G06N 99/005 |
| 2017/0169314 A1* | 6/2017 | Dijkman | G06K 9/4628 |
| 2017/0206405 A1* | 7/2017 | Molchanov | G06K 9/00355 |
| 2017/0316308 A1* | 11/2017 | Srivastava | G06N 3/04 |
| 2017/0330069 A1* | 11/2017 | Liu | G06N 3/063 |
| 2018/0046916 A1* | 2/2018 | Dally | G06N 3/08 |

OTHER PUBLICATIONS

LeCun et al.; Deep Learning; Nature (nature.com); vol. 521, pp. 436-444; May 28, 2015.*

(Continued)

*Primary Examiner* — Abul K Azad
(74) *Attorney, Agent, or Firm* — Occhiuti & Rohlicek LLP

(57) ABSTRACT

A data processing technique uses an Artificial Neural Network (ANN) with Rectifier Linear Units (ReLU) to yield improve accuracy in a runtime task, for example, in processing audio-based data acquired by a speech-enabled device. The technique includes a first aspect that relates to initialization of the ANN weights to initially yield a high fraction of positive outputs from the ReLU. These weights are then modified using an iterative procedure in which the weights are incrementally updated. A second aspect relates to controlling the size of the incremental updates (a "learning rate") during the iterations of training according to a variance of the weights at each layer.

21 Claims, 7 Drawing Sheets

(56) References Cited

OTHER PUBLICATIONS

Le et al.; A Simple Way to Initialize Recurrent Networks of Rectified Linear Units; Google, arXiv:1504.00941v2 [cs.NE], pp. 1-9; Apr. 7, 2015.*

Liew et al.; Bounded activation functions for enhanced training stability of deep neural networks on visual pattern recognition problems; In Neurocomputing. Dec. 5, 2016 216, pp. 718-734; DOI: 10.1016/j.neucom.2016.08.037 (Year: 2016).*

Moons et al.; Energy-Efficient ConvNets Through Approximate Computing; IEEE Winter Conference on Applications of Computer Vision (WACV 2016) (AN: edsarx.1603.06777); Mar. 22, 2016 (Year: 2016).*

Hwang et. al.; Fixed-Point Performance Analysis of Recurrent Neural Networks; Dec. 4, 2015; AN: edsarx.1512.01322), Database: arXiv (Year: 2015).*

Xia et al.; Switched by Input: Power Efficient Structure for RRAM-based Convolutional Neural Network; DAC: Annual ACM/IEEE Design Automation Conference. Jun. 2016, pp. 737-742. 6p. (Year: 2016).*

Zeiler, Matthew D., M. Ranzato, Rajat Monga, Min Mao, Kun Yang, Quoc Viet Le, Patrick Nguyen et al. "On rectified linear units for speech processing." In Acoustics, Speech and Signal Processing (ICASSP), 2013 IEEE International Conference on, pp. 3517-3521. IEEE, 2013, 5 pages.

Dahl, George E., Tara N. Sainath, and Geoffrey E. Hinton. "Improving deep neural networks for LVCSR using rectified linear units and dropout." In Acoustics, Speech and Signal Processing (ICASSP), 2013 IEEE International Conference on, pp. 8609-8613. IEEE, 2013, 5 pages.

He, Kaiming, Xiangyu Zhang, Shaoqing Ren, and Jian Sun. "Delving deep into rectifiers: Surpassing human-level performance on imagenet classification." In Proceedings of the IEEE international conference on computer vision, pp. 1026-1034, 2015.

Glorot, Xavier, Antoine Bordes, and Yoshua Bengio. "Deep sparse rectifier neural networks." In Proceedings of the Fourteenth International Conference on Artificial Intelligence and Statistics, pp. 315-323, 2011.

* cited by examiner ations of training. The two
INITIALIZING AND LEARNING RATE ADJUSTMENT FOR RECTIFIER LINEAR UNIT BASED ARTIFICIAL NEURAL NETWORKS

BACKGROUND

This invention relates to initialization and learning rate adjustment for artificial neural networks (ANNs) based on rectifier linear unit (ReLU).

ANNs have been used for tasks including mapping of input vectors derived from inputs, for instance acoustic inputs that include speech, to probability distributions that are used, for instance, for speech recognition. Operation of an ANN is determined by the structure of a data flow graph for the ANN, which may use numerical coefficients, generally referred to as "weights", that multiply numerical values passing through the graph. The characteristics of the weights can have a great impact on the performance of system making use of the ANN.

Two aspects of ANNs have been used to achieve high performance. First, ANNs with a large number of hidden layers (for example, five or more layers) have shown advantages over using fewer layers. Each hidden layer includes a set of nodes that are internal to the data flow graph such that data generally flows from layer to layer within the graph. Second, the hidden nodes implement non-linearities that include "rectifier" functions (i.e., mappings from a numerical input value to a numerical output value), which map negative input values to zero, and map positive input values to the output without modification. In general, the input value to a rectifier at one layer is a weighted sum of the output values of the directly previous layer. Nodes that make use of such rectifier functions of weighted inputs may be referred to as Rectifier Linear Units (ReLUs).

DETAILED DESCRIPTION

A data processing technique uses an Artificial Neural Network (ANN) to yield improve accuracy in a runtime task. Such an ANN is used, for example, for a task of processing audio-based data acquired by a speech-enabled device. The technique includes a first aspect that relates to initialization of the ANN weights, which are then modified using an iterative procedure in which the weights are incrementally updated. A second aspect relates to controlling the size (i.e., magnitude) of the incremental updates (referred to as a "learning rate") during the iterations of training. The two aspects can be used independently.

Figure 1:
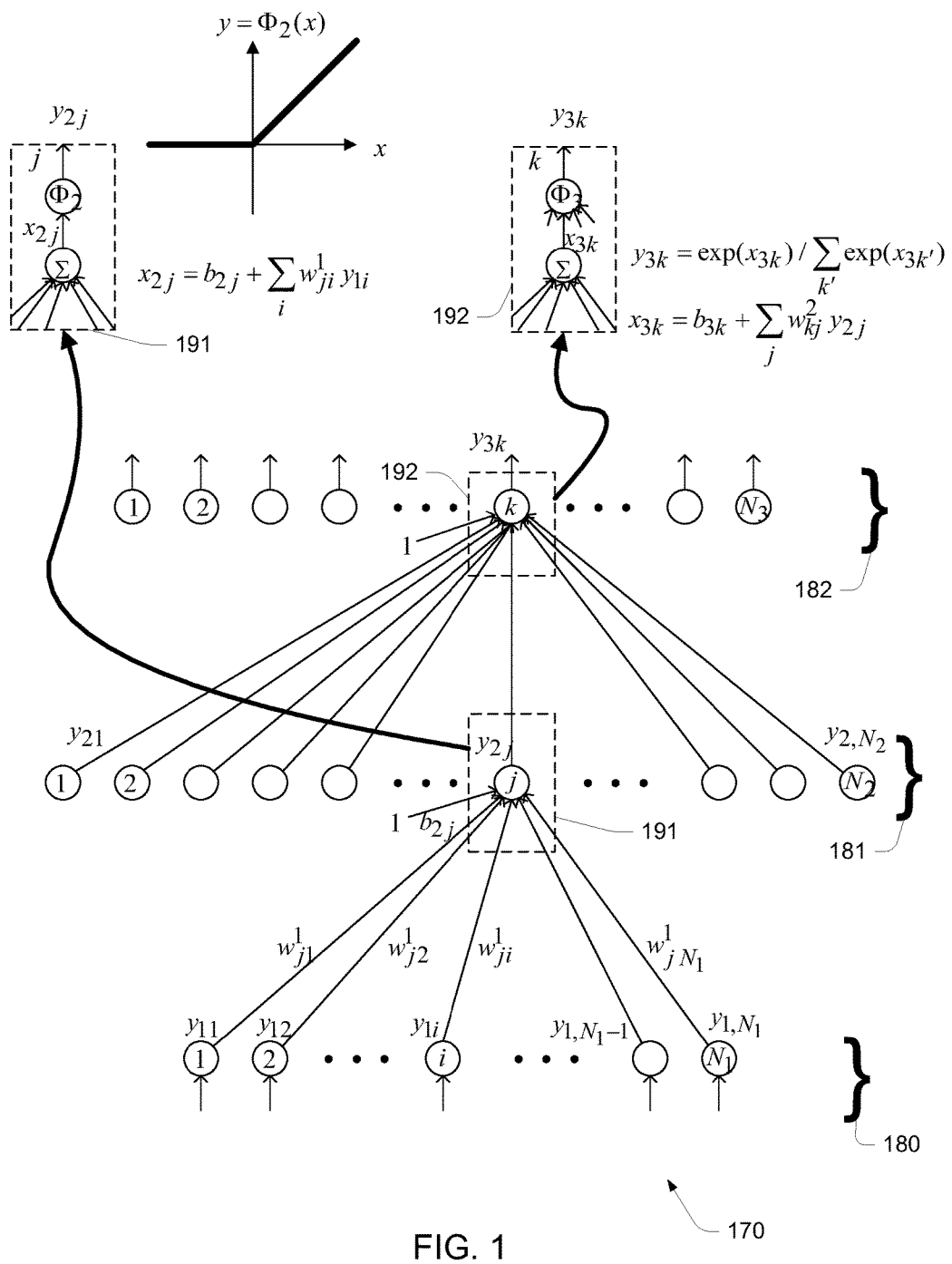
FIG. 1 is a data flow graph for an artificial neural network (ANN) with rectifier linear units (ReLUs) at an interior hidden layer and softmax units at an output layer.

Referring to FIG. 1, an example of an ANN 170 that is configured and used according to aspects described herein includes multiple layers, in this case, an input layer 180, one hidden layer 181, and an output layer 182. As discussed in more detail below, other examples may have more than one hidden layers 181. Each layer includes a number of nodes, denoted $N_n$ for the number of nodes at layer n. As shown in the figure, the nodes at a particular layer n are indexed from 1 to $N_n$. The ANN 170 forms a data flow graph in which inputs are provided to the first layer 180, and through a series of computations specified by the data flow graph, including non-linear transformations performed at the nodes, a number of outputs are provided. In this example, the outputs have the property that they have values between 0.0 and 1.0, and that the sum of the output values is 1.0. That is, the outputs have the characteristic of a probability distribution. This data flow graph is executed at runtime, for example, to process acquired acoustic data with the outputs of the ANN being used to recognize speech in that acoustic data.

In the ANN 170 shown in FIG. 1, the nodes of the hidden layer 181 implement "rectifier" functions of a weighted sum of the output values from the previous layer, in this case from the input layer 180. A computation 191 at the $j^{th}$ node can be represented as a weighted summation (i.e., the sum of weight values times input values) followed by application of a rectifier function with the summation as the input. Specifically, the output values of the first layer, denoted $y_{1i}$, for i going from 1 to $N_1$, are each multiplied by respective numerical weights and summed. The $i^{th}$ value is multiplied by a weight $w_{ji}^1$. The sum also includes a bias value, $b_{2j}$, such that the total sum is $$x_{2j} = b_{2j} + \Sigma_i w_{ji}^1 y_{1i}.$$

This sum is then passed through a non-linear function $\Phi_2$, which in this case is a "rectifier" function defined as $$\Phi_2(x) = \begin{cases} 0 & \text{if } x < 0 \\ x & \text{if } x \geq 0 \end{cases}$$

to yield $$y_{2j} = \Phi_2(x_{2j}).$$

The computation 191 may be referred to as a Rectifier Linear Unit (ReLU) computation.

The output layer has similarly structured computations 192. However, the non-linear element implements the "softmax" function $$\Phi_3(x) = \exp(x) / \Sigma_{x'} \exp(x')$$

where the sum over x' is over the inputs to the non-linear elements at each of the nodes of the layer (and therefore, the function $\Phi_3$ depends on all the x values, and is not independent from node to node). The denominator results in the sum of the outputs of the nodes of the output layer being 1.0.

Figure 2:
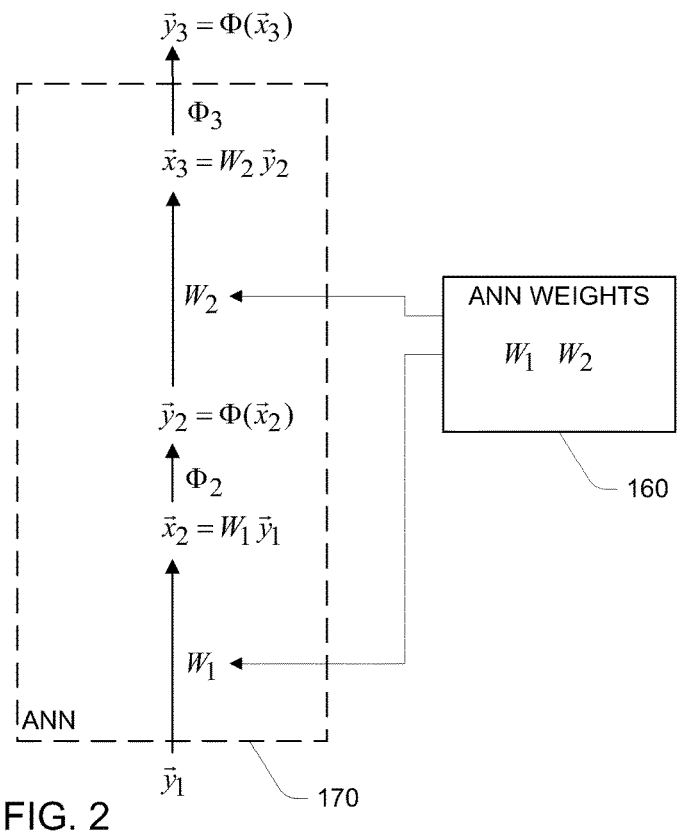
FIG. 2 is a data flow graph for a vector/matrix representation of the ANN of FIG. 1.

Referring to FIG. 2, the data flow graph of the ANN 170 of FIG. 1 is represented in a vector form. For example, $\vec{y}_1$ denotes a column vector of values, $(1, y_{11}, \ldots, y_{1N_1})^T$, where the leading 1 is used to introduce the bias values such that the $j^{th}$ row of $W^1$ has the entries $(b_{2j}, w_{j1}^1, \ldots, w_{jN_1}^1)$. Each non-linear function $\Phi_n(\vec{x})$ is applied element-wise to the entries of its input. The weights 160 determine the operation of the ANN data flow graph at runtime in that they impart the specific computational functionality of the ANN. That is, the form of the computation is generally determined by software instructions that are executed on a processor in a runtime system (or equivalent hardware circuitry that implements the computation) and the specific computations performed by those instructions are determined by the ANN weights. Both the processor instructions and the weights for the ANN are stored in a non-transient storage in the runtime system (for instance non-volatile semiconductor memory) to configure the operation of the ANN.

Figure 3:
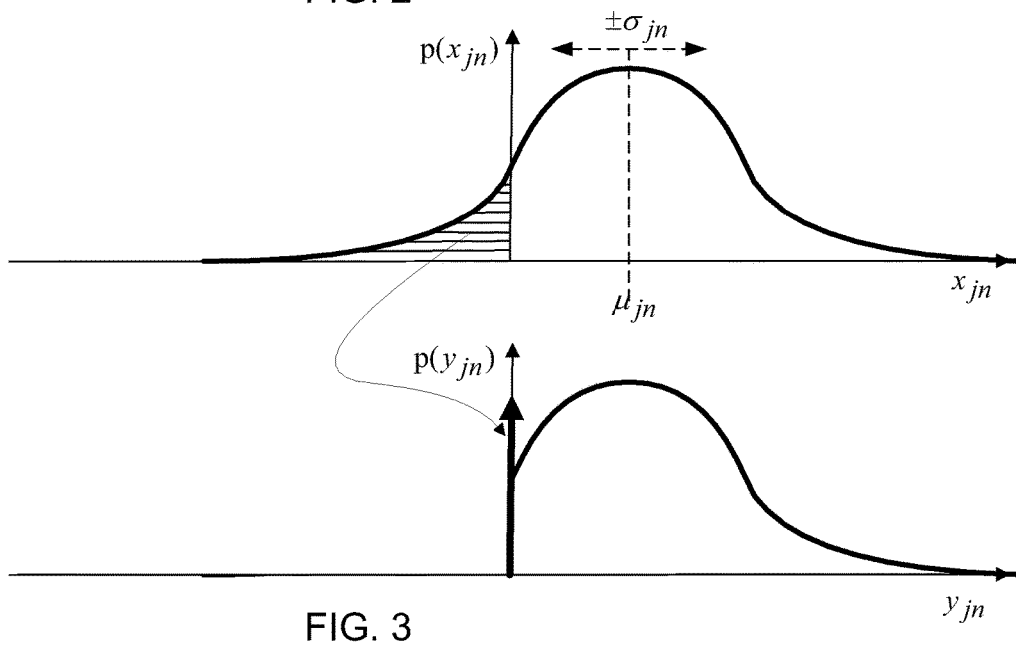
FIG. 3 is a graph of a distribution of input values ($x_{jn}$) of the rectifier of the $j^{th}$ ReLU unit at the $n^{th}$ layer, and corresponding graph of a distribution of an output value ($y_{jn}$) of that unit.

Referring to FIG. 3, a characteristic of the ReLU units is that if an input $x_{jn}$ has distribution (which may be represented as a probability density function, pdf) of the form $p(x_{jn})$, then the distribution of the output $y_{jn}$ is essentially truncated for $x_{jn}<0$ such that the entire probability mass for those negative values is moved to $y_{jn}=0$, as shown in the lower curve in the figure. In general, the probability of an input yielding a zero output depends on the mean $\mu_{jn}$ and standard deviation (square root of the variance) $\sigma_{jn}$. For example, if $\mu_{jn}=0$, then on average, one half of the inputs yield zero output. (In the discussion below, $\text{var}(x_{jn})$ is used interchangeably with $\sigma_{jn}^2$).

Figure 4:
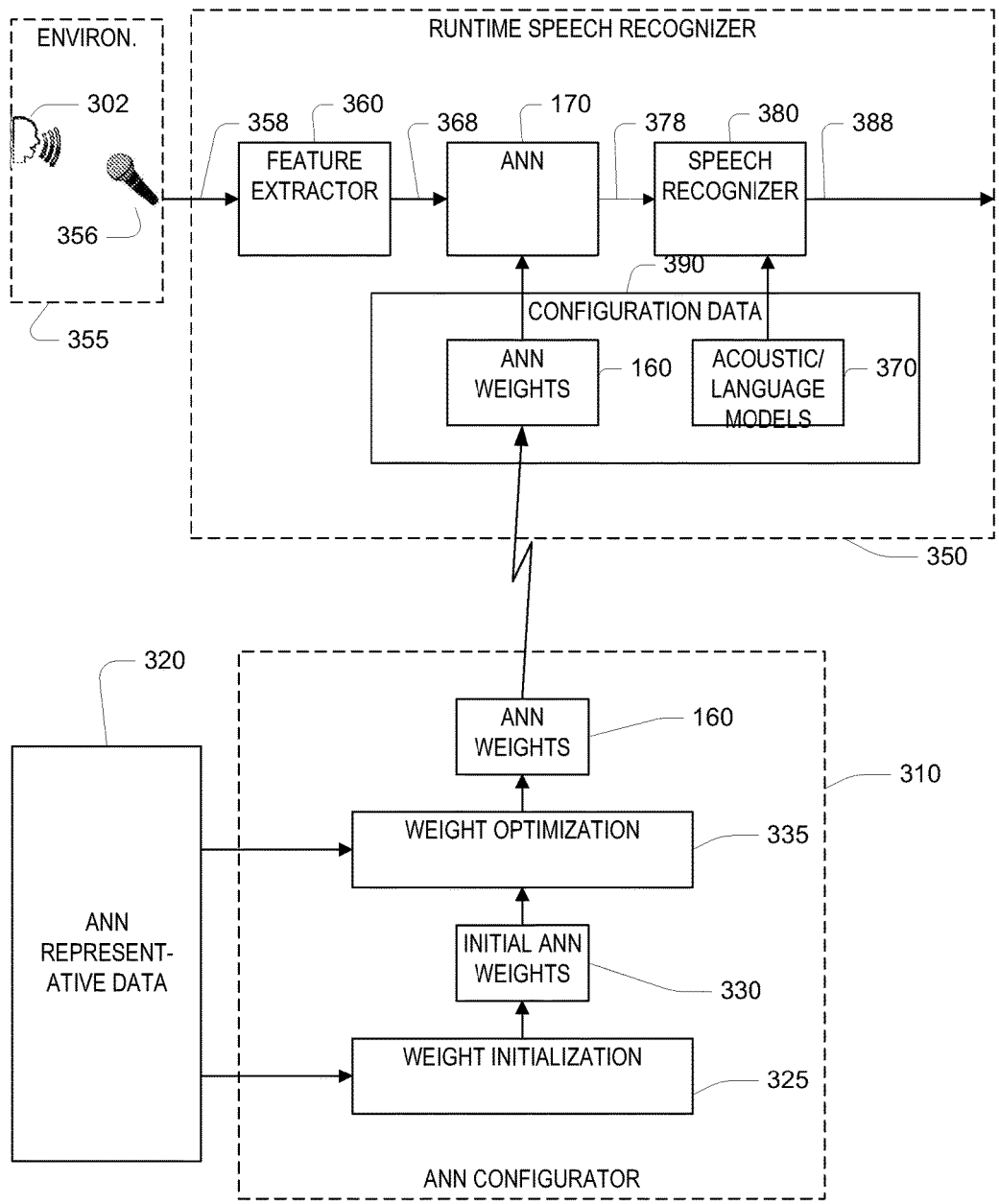
FIG. 4 is a block diagram showing a runtime configuration that uses the ANN of FIGS. 1 and 2, and a runtime configuration used to determine the weights of the ANN.

Referring to FIG. 4, a runtime speech recognizer 350 includes the ANN 170, and the stored weights 160 which determine the particular functionality of the ANN, which may be implemented using a software controller processor, custom logic or analog circuitry, or both. In this device, a microphone 356 senses an acoustic signal in an environment 355, such as a home living room, with the acoustic signal including speech spoken by a user 302. An electrical or data representation 358 of the acoustic signal is passed through a feature extractor 360, which produces a sequence of numerical vectors that represent the acoustic input. For example, the vectors are Log Frequency Band Energy (LFBE) vectors. These numerical vectors are processed by the ANN 170 to provide an input 378 comprising a sequence of probability distributions to a speech recognizer 380. The speech recognizer, which makes used of acoustic and language models 370, provides an output representing the speech of the user 302, for example, as a sequence of recognized words, or as a more complex data structure, for instance a word lattice or an N-best list. One measure of performance of this overall process is the word accuracy of the output of the speech recognizer as compared to the words truly spoken by the user 302.

It should be understood that device shown in FIG. 4 applies the ANN to inputs derived from speech input. However, the approach is not limited to speech input, and can be applied to other application domains, for example, to other language processing, face recognition, etc. Certain parameters may depend on the application domain. For example, a target mean and standard deviations for the distributions of values input to the rectifier functions may be best for one domain, with a different mean and standard deviation may be best for another domain.

Prior to operating in the runtime configuration, the ANN weights 160 are determined in an ANN configurator 310. The configurator essentially uses representative data 320 that includes pairs of corresponding inputs and outputs for the ANN. In the configurator shown in FIG. 4, there are two phases to the process of determining the weights. An initial set of weights 330 is determined by a weight initialization 325. The weights are then iteratively updated by a weight optimization 335 to yield the ANN weights 160, which will be used in the runtime configuration.

The weight optimization 335 essentially incrementally updates the weights to better match the input-output pairs of the ANN representative data 320. As a mathematical optimization, this iteration does not necessarily always yield the same final ANN weights even if a large number of iterations are performed. This may be due to there being many local maxima in the objective function being maximized. Therefore, the choice of initial weights set by the weight initialization 325 can have a great effect on the final weights that are found via the weight optimization 335.

One reason that the initial weight values may impact the final weight values that are converged to after weight optimization may relate to the nature of the rectifier units. Generally, the weights are updated based variational principles in which a weight is incremented in proportion to the sensitivity of the objective function to that weight. For example, a back-propagation approach or a stochastic gradient approach may be used based on gradient computations. However, for a weight $w_{ji}$ that determines the input to the rectifier of node j for which a large fraction (e.g., half) of the inputs yield a negative input to the rectifier, only the half of the ANN inputs that yield positive values can have an impact on the update of the weight. This may make the sensitivity to particular parts of the representative data greater than if all or most of the data yield non-zero output.

Another reason the initial weights may impact the final weights is the nature of the overall transformation implemented by the ReLU layers. Generally, the transformation is piecewise linear (i.e., each region of the space of input vectors is associated with a corresponding affine function). To the extent that more of the ReLU units yield non-zero outputs, there may fewer piecewise linear regions for which the affine transforms are estimated, or more data may be used to estimate a single affine transform with regions of the input space being effectively assigned to additional regions during training.

One approach to initialization of the weights, including the $w_{jn}$ and the $b_j$, in an ANN is to select them from a zero-mean distribution, for example, in a uniform distribution $U[-0.1,0.1]$. If all the input values $y_{1i}$ have zero mean as well, then on average the inputs $x_{jn}$ also have zero mean, and half the inputs to the rectifiers are negative yielding zero outputs. Therefore, this sort of initialization yields the situation in which only half of the ANN inputs affect the updates to the weight values.

A preferable approach to determining the initial ANN weights 330 seeks to yield an average distribution $p(x)$ (averaged over input-output pairs of the ANN representative 320 as well as averaged over the nodes of the first hidden layer 181 (see FIG. 1)) that limits the fraction of units that have zero outputs. Generally, referring to FIG. 3, the initial weights are chosen such that the average distribution has a mean of $\mu_x=1.5$ and a standard deviation of $\sigma_x=1.0$. Assuming that the distribution $p(x)$ is Gaussian or approximately so, over 93% of the inputs are in the positive region, and fewer than 6.7% of the outputs are therefore initially zero. Note that if $\mu_x=2.0$ over 97% of the inputs are in the positive region, and fewer than 2.8% of the outputs are zero.

In some embodiments, at the first layer, based on processing at the input layer 180 of the ANN, each of the values $y_{1i}$ has a zero average and a unit variance (and therefore a unit standard deviation) over the representative data 320. The biases are set deterministically to $b_{2j}=1.5$, and the weights $w_{ji}^1$ are chosen from independently at random from a uniform distribution $U[-k_1 0.1,+k_1 0.1]$. Because the average value of the weights are zero, the average input to the rectifier is the fixed bias of 1.5.

The reader should note that the selected value of a scale factor $k_1$ affects the standard deviation of the distribution $p(x)$, as shown in FIG. 3. Because the mean is fixed at $\mu=1.5$, increasing $k_1$ increases $\sigma$, which in turn increases the fraction of inputs that result in negative inputs to the rectifier. It should be recognized that there is a value of $k_1$ that yields a standard deviation of $\sigma=1$, and therefore yields the low probability (approximately 3%) of negative inputs to the rectifier.

One approach to selecting $k_1$ makes use of a computation that takes advantage of an assumed independence of the terms $y_{1i}$. Under these conditions, and the definition $$x_{2_j} = b_{2_j} + \sum_{i=1}^{N_1} w_{ji}^1 y_{1i}$$

then $$\mathrm{var}(x_{2_j}) = \sum_{i=1}^{N_1} \mathrm{var}(w_{ji}^1)\mathrm{var}(y_{1i}).$$

With the weights selected from a uniform distribution $U[-k_1 0.1, +k_1 0.1]$, then the variance of the weights is known analytically to be $\mathrm{var}(w_{ji}^1)=(0.2k_1)^2/12$. The variance of the outputs of the input layer, $\mathrm{var}(y_{1i})$, is estimated empirically using the representative data 320, for example, by passing some or a smaller representative sample of the data through the input layer. In any case, it can be seen that to yield $\mu=1$, $k_1$ can be selected to satisfy $$(k_1)^2 = \left(\frac{12}{0.2^2}\right)\left(\frac{1}{\sum_i \mathrm{var}(y_{1i})}\right).$$

In this example, the weights $W^2$ that are used for the output layer are determined without necessarily considering similar distribution aspects because the softmax output functions do not necessarily result in similar issues as the ReLU units. However, for the analysis below, we assume that they are multiplied by a scale factor $k_2$ to also yield a unit variance input to the non-linearity of the output layer.

Having initialized the weights of the ANN 170, one approach to implementing the weight optimization 335 is according to a learning rate characterized by a scalar $\alpha$. For each input-output pair of the representative data 320, indexed by t, the output of the ANN yields a score (e.g., objective function) $L_t$, for example, based on a cross-entropy calculation based on the output of the ANN and the corresponding output in the representative data. One approach to updating each weight is according a form $$w_{ji}^1 \leftarrow w_{ji}^1 + \alpha \sum_{t \in \mathrm{batch}} \frac{\partial L_t}{\partial w_{ji}^1}.$$

where the "batch" is a relatively small subset of the representative data 320. In some examples the learning rate is set at a constant, for example, $\alpha=0.0008$, which may be selected using a rule of thumb for similar speech-derived inputs with zero means and unit variances, batches of data in the order of 512 samples, and layers with approximately 1000 hidden units.

An approach to modifying a standard learning rate $\alpha$ is based on assessing how such a learning rate should be modified if the weights at various layer of the ANN are modified. For example, if the weights at the first layer are multiplied by a scale factor $k_1$ and the weights at the second layer are multiplied by $k_2$, the standard learning rate that would have been used for the unmodified weights is essentially modified to yield equivalent update steps according to the scale factors $k_1$ and $k_2$.

The impact of scaling the weights at the first layer by $k_1$ can be assessed by first multiplying the weight update expression by $k_1$. Essentially, the weights in the scaled ANN are equivalent to products $k_1 w_{ji}^1$. The scaled expression is $$k_1 w_{ji}^1 \leftarrow k_1 w_{ji}^1 + k_1 \alpha \sum_{t \in \mathrm{batch}} \frac{\partial L_t}{\partial w_{ji}^1}.$$

In this scaled update expression, the term in the sum can be expanded (e.g., using the chain rule) as $$\frac{\partial L_t}{\partial w_{ji}^1} = \frac{\partial L_t}{\partial y_{2j}(t)} \frac{\partial y_{2j}(t)}{\partial w_{ji}^1} = \frac{\partial L_t}{\partial y_{2j}(t)} \Phi'_2(x_{2j}(t)) y_{1i}(t)$$

where the derivative $\Phi'_2(x_{2j})$ is either 0 or 1 depending on the sign of $x_{2j}$, and by the design of the initialization to yield mostly positive $x_{2j}$ is almost always 1. The term $$\partial L_t / \partial y_{2j}(t)$$

can be expressed as $$\frac{\partial L_t}{\partial y_{2j}(t)} = \sum_{k=1}^{N_3} \frac{\partial L_t}{\partial x_{3k}(t)} \frac{\partial x_{3k}(t)}{\partial y_{2j}(t)} = \sum_{k=1}^{N_3} \frac{\partial L_t}{\partial x_{3k}(t)} w_{kj}^2.$$

As introduced above, with a conventional approach with random weights, roughly half the hidden nodes have zero output and don't contribute to the sum over k. With the new initialization, almost all the terms in the sum over t are nonzero. Therefore, the sum is expected to be roughly 2 times as large by that factor alone. As introduced above, each of the weights $w_{kj}^2$ is assumed to be scaled by a factor of $k_2$, therefore the sum over nodes k is further scaled by $k_2$ as compared to the situation in which the $w^2$ weights are not scaled, yielding a total scaling of the sum over k of a factor of $2k_2$.

Therefore, to account for the scaling of the hidden layer weights by $k_1$, and to account for roughly twice as many of the hidden layer nodes being active, and to account for the output layer weights being scaled by $k_2$, the learning rate for the hidden layer weights, denoted $\alpha_1$ is chosen to be a scaling by $k_1/2k_2$ yielding $\alpha_1 = \alpha k_1/2k_2$ of the standard learning rate that would be applied to the unscaled weights.

A similar analysis can be performed to assess the effect of scaling of the weights on the learning rates for the output layer, which yields a hidden layer update rate of $\alpha_2 = \alpha k_2/2k_1$.

Figure 5:
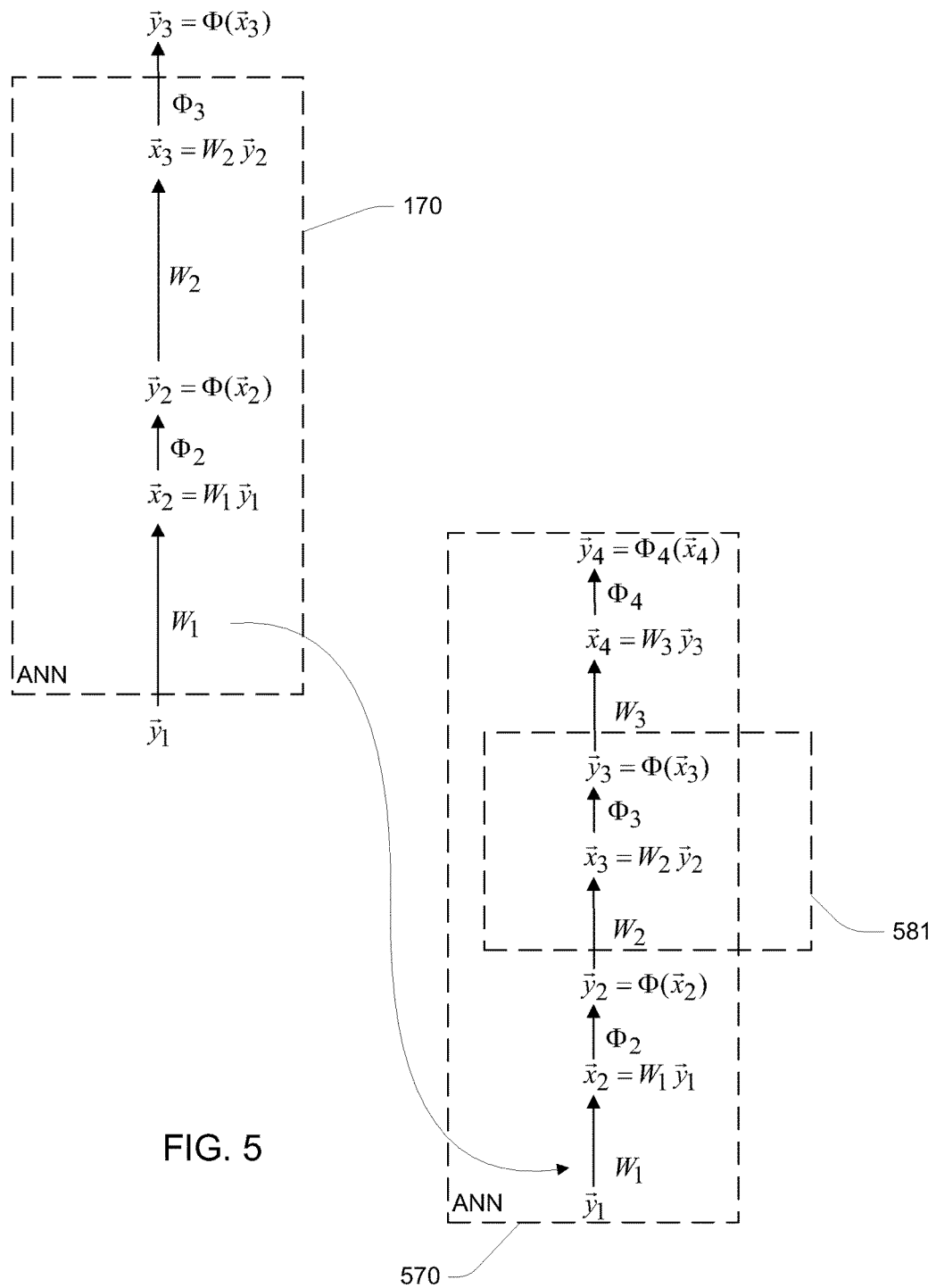
FIG. 5 is a diagram that illustrates addition of additional hidden layers.

The approach described above in the context of a one-hidden-layer ANN can be extend to more layers as follows. Referring to FIG. 5, in one approach, after the weights of the ANN 170 described above have been determined, a new ANN 570 is constructed in which a new ReLU layer 581 is inserted above the existing hidden layer 181. Therefore, nonlinear functions $\Phi_2$ and $\Phi_3$ are rectifiers, and the output nonlinearity $\Phi_4$ is a softmax as in the prior ANN 170.

Initialization of the weights is performed as follows. The weights $W^1$ are passed from the prior ANN 170 to the new ANN 570 without modification. The weights $W^2$ of the new hidden layer, and the weights $W^3$ of the output layer, are initialized using an approach similar to that used for ANN 170.

For the weights $W^2$, a scale factor $k_2$ defining the distribution from which to draw the $w_{kj} \sim U[-k_2 0.1, +k_2 0.1]$ is chosen such that $$\text{var}(x_{3k}) = \sum_{j=1}^{N_2} \text{var}(w_{kj}^2) \text{var}(y_{2j}) = 1.$$

As before the variance of the weight is determined analytically as $\text{var}(w_{kj}^2) = (0.2 k_2)^2/12$ and $$\sum_{j=1}^{N_2} \text{var}(y_{2j})$$

$\text{var}(y_{2j})$ is determined based on the training data or a representative sample of the training data. The scale factor $k_3$ is similarly determined to yield $\text{var}(x_{4l}) = 1$ averaged over output nodes l. For the weights $W^1$ transferred from the previously trained ANN, the scale factor $k_1$ is reestimated under the assumption that the weights remain uniformly distributed.

In another approach to determining the initial weights, the approach illustrated in FIG. 5 is wholly or partially avoided by estimating the weights for multiple layers without intervening iterative optimization. For example, all the weights may be initialized on layer at a time (from the input layer to higher layers), and only after all the layers are initialized is the iterative optimization performed.

For the iterative weight optimization, the adjustment of the learning rate $\alpha$ for the layers follows the same type of analysis as described above, yielding adjusted learning rates $$\alpha_1 = \left(\frac{1}{2}\right)^2 \frac{\alpha k_1}{k_2 k_3}; \alpha_2 = \left(\frac{1}{2}\right)^2 \frac{\alpha k_2}{k_1 k_3}; \text{ and } \alpha_3 = \left(\frac{1}{2}\right)^2 \frac{\alpha k_3}{k_1 k_2}.$$

This procedure is repeated to add further layers, for example, transferring the newly trained weights $W^1$ and $W^2$ to a new ANN with an additional hidden layer, and the new weights $W^3$ and $W^4$ being initialized using the approach described above. This can be repeated, each time essentially inserting a hidden layer, initializing two layers of weights to random values, and transferring the remaining weights from the previously trained ANN.

Learning rate adjustment follows the same approach. In general, with M hidden layers, the learning rates for the $m^{th}$ hidden layer are set as $$\alpha_m = \left(\frac{1}{2}\right)^M \left(\alpha k_m / \prod_{j=1, j \neq m}^{M+1} k_j\right).$$

It is important to note that when initialized, a very high fraction of ReLU nodes are activated (i.e., have non-zero output) on average, for example, with over 97% of the nodes for a typical input vector. After the weight optimization, what is noteworthy is that the average number of ReLU nodes that are activated remains high, generally with substantially more and/or statistically significantly more than 40% of the ReLU nodes being active on average, and in some examples, with over 50% of the ReLU nodes remaining active on average. This is in contrast to results with random initialization in which about 50% of the nodes are initially activated. With weight optimization with such initialization, the fraction of activated ReLU nodes is observed to go down, for example, to approximately 22%. A possible interpretation of this result is that the initialization with a high fraction of activated units effectively results in selection of a local optimum of the weights that has a higher average number of activated nodes results from more conventional initialization and/or update approaches.

It should be understood that the random weight selection by drawing each weight from a scaled uniform distribution is only one way of random initialization. Another approach is to select a matrix $W^m$ of weights with orthonormal rows, for example, based on a scaled random rotation matrix. One approach to generating such a matrix is to first generate a random $N_m \times N_{m+1}$ random real-valued matrix M, and perform a Singular Value Decomposition (SVD) of the random matrix yielding $M = U\Sigma V$ for unitary matrices U and V and diagonal matrix $\Sigma$. In particular, the matrix V is an $N_{m+1} \times N_{m+1}$ matrix with orthonormal rows. Therefore with $N_m = N_{m+1}$, the weights $W^m$ are chosen as a multiple of V. In some examples, a single multiplier $k_m$ is used to yield the desired variance of the average distribution, as in the following express $$\vec{x}_{m+1} = \vec{b}_{m+1} + W^m \vec{y}_m = \vec{b}_{m+1} + k_m V \vec{y}_m$$

The reader will see that if the $\vec{y}$ values have a covariance Q, then the $\vec{x}$ values have a covariance $VQV^T$. If we denote the diagonal values of this matrix as $q_k$, and the variance of the inputs to the rectifier units have variance $$\text{var}(x_{mk}) = k_m^2 q_k$$

and then the $k_m$ is chosen to satisfy $$k_m = AVE\left(\sqrt{\frac{1}{q_k}}\right).$$

Alternatively, rather than determining the diagonal terms of $VQV^T$ analytically, estimates of those terms are determined empirically over some or all of the representative data. With the weights selected in this random manner, the other aspects of the weight determination can remain the same.

In some examples, rather than using a single multiplier for the entire layer, the weighted values are multiplied by node-specific multipliers $k_{mk}$ for the $k^{th}$ node, for example as $$k_{mk} = \left(\sqrt{\frac{1}{q_k}}\right); k_m = AVE(k_{mk})$$

If $N_m > N_{m+1}$, the only the first $N_m$ rows of V are used. $N_m < N_{m+1}$, then weights for all the nodes cannot all be orthogonal, and therefore multiple sets of weights are determined using multiple random matrices.

Figure 6:
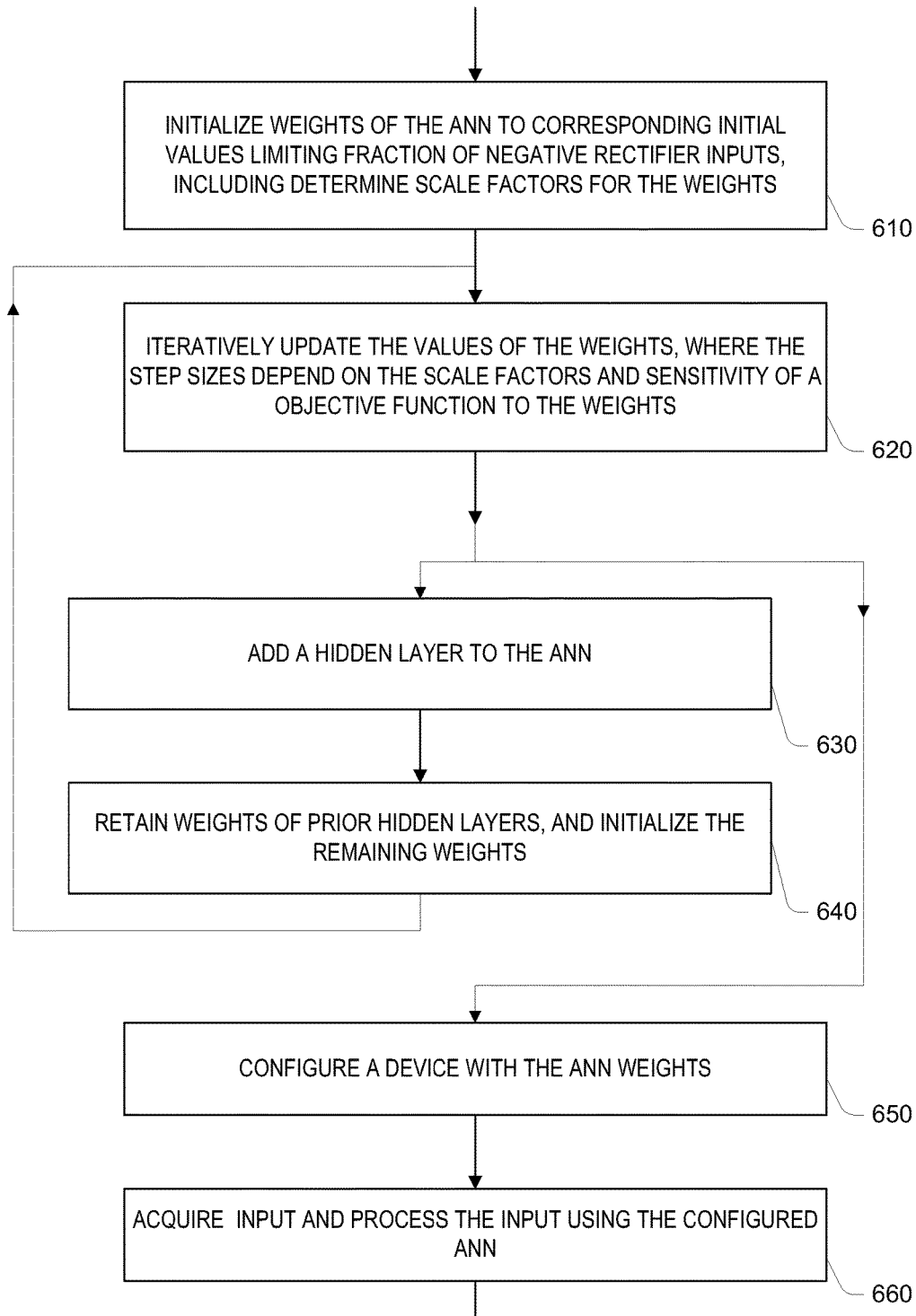
FIG. 6 is flowchart.

Referring to FIG. 6, a flowchart summarizes the procedure described above. At a step 610, ANN weights are initialized to initial values. These initial values limit the fraction of negative inputs to the rectifier functions of the ReLU of the ANN, for example, to fewer than 3% or 5% of the inputs. The weights are selected by determining a scale factor (e.g., the $k_n$) which represents an average range of weights (e.g., a variance of a random distribution of the weights) for a layer. At step 620, the values of the weights are iteratively updated. The step sizes of the weights depend of the scale factors, as well as the sensitivity of an object function (e.g., $$\partial L/\partial w)$$

being optimized in the iterations. These optimized weights may be used to configure a device with the ANN to be used at runtime (step 650), and then input data is acquired and processed using the configured ANN (step 660). For multiple hidden layers, after the iterative updating of values of the weights (step 620), a hidden layer is added above the other hidden layers at step 630. Then, at step 640, the weights of the prior hidden layers are retained (recomputing the scale factors), the remaining weights are initialized using the same procedure as at step 610.

Figure 7:
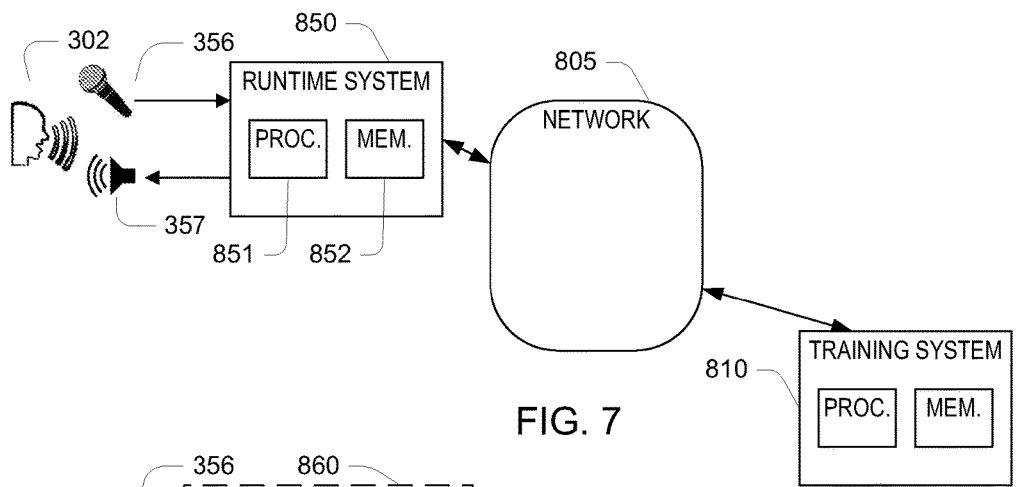
FIG. 7 is block diagram of a system configuration.
Figure 8:
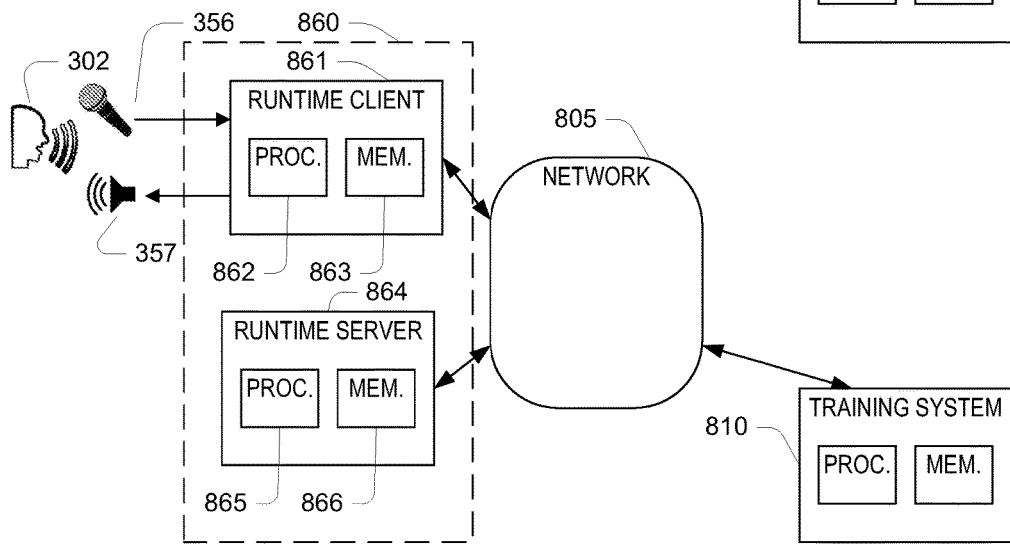
FIG. 8 is a block diagram of a system configuration with a distributed runtime system.
Figure 9:
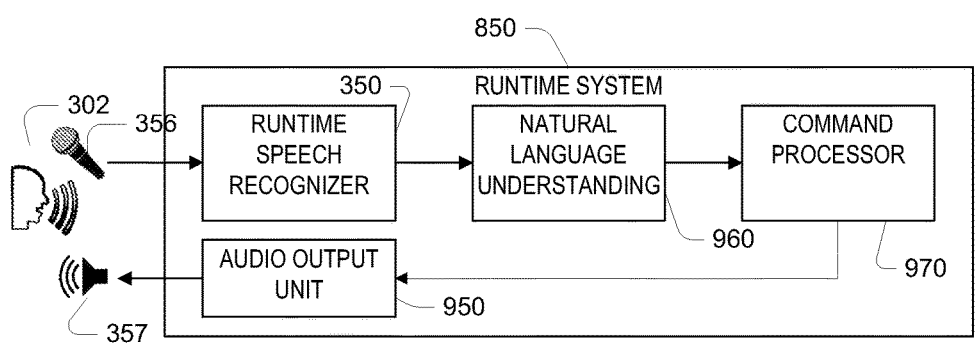
FIG. 9 is a logical block diagram of a runtime system.

Referring to FIG. 7, in some implementations, the runtime speech recognizer 350 shown in FIG. 4 is hosted on a runtime system 850. The runtime system accepts audio input from a user 302 at a microphone, and optionally provides audio output to the user via a speaker 357. The runtime system may include a processor 851, for instance a general purpose processor or a digital signal processor (DSP), and a memory 852 (e.g., a non-transitory semiconductor memory readable by the processor). For example, the runtime system is an "appliance" that may be placed in the environment (e.g., on a shelf or table). In some examples, this device monitors its environment, and acts on user input, such as spoken commands, that is sensed in the environment. The runtime speech recognition procedures described above may be implemented in software that includes instructions for causing the processor 851 to perform the steps of the described procedures. The memory 852 also holds the configuration data 390, for example, including the ANN weights, and in software-based implementations software instructions for performing the numerical computations for the ANN, including the numerical computation of the weighted summations and evaluation of the rectifier functions described above. The runtime system 850 may be coupled to a network 805 (e.g., a local area network and/or the public Internet) to a configuration system 810, which hosts the ANN configurator 310 shown in FIG. 4. This configuration system also includes a processor and memory for implementing the procedures of the training configuration, and in particular the procedures for determining the ANN weights described above. The ANN weights are provided by the configuration system to the runtime system, for example, being passed via the network 805 and/or installed in the runtime system as part of a manufacturing or provisioning of the runtime system. Referring to FIG. 8, in some implementations, the functions hosted by the runtime system 850 of FIG. 7 are distributed in a distributed runtime system 860, which may have a runtime client 861, with a processor 862 and memory 863, and there is also a runtime server 864, which interacts with the runtime client 861 at runtime. For example, the runtime client 861 may implement data acquisition (e.g., signal processing and speech activity detection or detection of a wakeword) and feature extraction, and send the result to the runtime server 864 over the network 805, where speech recognition and/or natural language processing based on the received data is performed. Referring to FIG. 9, the runtime system 850 of FIG. 7 (as well as the combined computers of the distributed runtime system 860 of FIG. 8) implement a logical processing in which the audio data produced from the acquired audio signal received at the microphone 356 is processed by the runtime speech recognizer 350 to produce, for example, a word sequence that is passed to a natural language understanding component 960. A representation of the word sequence, which may represent the intent or meaning of the words spoken by the user and acquired in the audio sign, may be passed from the natural language understanding component 960 to a command processor 970, which acts based on the data it receives. The command processor 970 may cause an audio output unit 950 to produce audio for presentation to the user 302 via a speaker 357.

Figure 10:
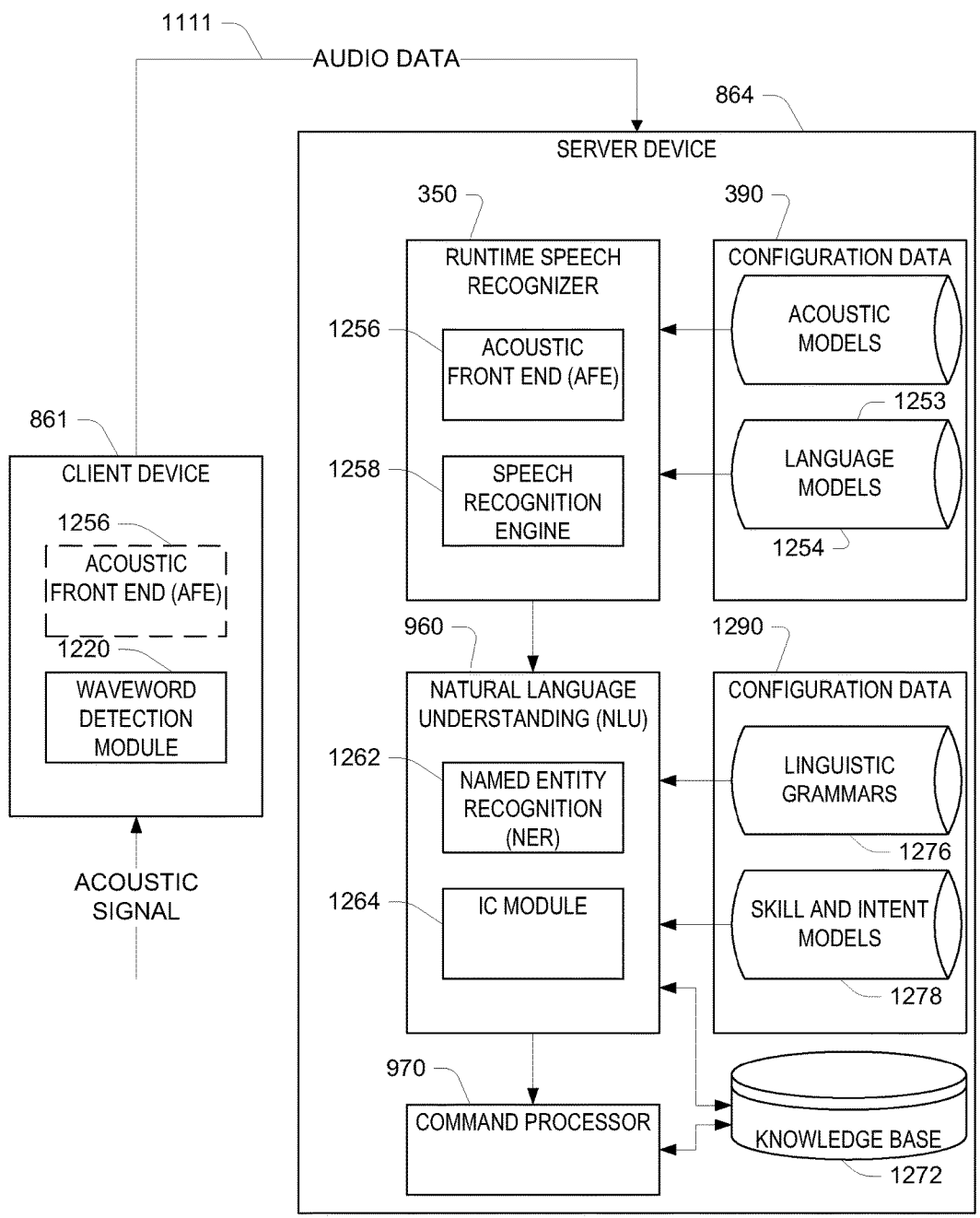
FIG. 10 is a diagram illustrating processing of a spoken utterance.

FIG. 10 presents a conceptual diagram of an example of how a spoken utterance is processed, allowing a system to capture and execute commands spoken by a user, such as spoken commands that may follow a wakeword. The various components illustrated may be located on a same or different physical devices. Communication between various components illustrated in FIG. 10 may occur directly or across a network 805. An audio capture component, such as a microphone of a client device 861, captures audio corresponding to a spoken utterance. The client device 861, using a wakeword detection module 1220, then processes the audio, or audio data corresponding to the audio, to determine if a keyword (such as a wakeword) is detected in the audio. Following detection of a wakeword, the device sends audio data 1111 corresponding to the utterance, to a server device 864 that includes an runtime speech recognizer 350. The audio data 1111 may be output from an acoustic front end (AFE) 1256 located on the device 861 prior to transmission. Or the audio data 111 may be in a different form for processing by a remote AFE 1256, such as the AFE 1256 located with the runtime speech recognizer 350.

The wakeword detection module 1220 works in conjunction with other components of the device, for example a microphone (not pictured) to detect keywords in audio. For example, the client device 861 may convert audio into audio data, and process the audio data with the wakeword detection module 1220 to determine whether speech is detected, and if so, if the audio data comprising speech matches an audio signature and/or model corresponding to a particular keyword.

The device 861 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the client device 861 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the client device 861 (or separately from speech detection), the client device 861 may use the wakeword detection module 1220 to perform wakeword detection to determine when a user intends to speak a command to the device 861. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the client device 861 may "wake" and begin transmitting audio data 1111 corresponding to input audio to the server device(s) 864 for speech processing. Audio data corresponding to that audio may be sent to a server device 864 for routing to a recipient device or may be sent to the server for speech processing for interpretation of the included speech (either for purposes of enabling voice-communications and/or for purposes of executing a command in the speech). The audio data 1111 may include data corresponding to the wakeword, or the portion of the audio data corresponding to the wakeword may be removed by the local device 861 prior to sending. Further, a local device 861 may "wake" upon detection of speech/spoken audio above a threshold, as described herein. Upon receipt by the server(s) 864, the runtime speech recognizer 350 may convert the audio data 1111 into text. The recgonizer transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance with reference to acoustic models 1253 and language models 1254. Generally, the acoustic models 1253 include data that characterizes input data corresponding to different speech sounds (e.g., phonemes or other subword units) and structure of words in terms of subword units, with the language models 1254 characterize the possibility or likelihood of different word sequences. In some examples, the acoustic models include weights used to configure one or more artificial neural networks (ANNs), such as a neural network that accepts as input a portion of the input data (e.g., as a vector of numerical values) and produces as output scores associated with different subword units. Other forms of acoustic models 1253 may also be used, for example, using parameterized probability distributions (e.g., Gaussian Mixture Models, GMMs).

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., acoustic models 1253, and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the runtime speech recognizer 350 outputs the most likely text recognized in the audio data. The recognizer may also output multiple hypotheses in the form of a lattice or an N-best list with each hypothesis corresponding to a confidence score or other score (such as probability scores, etc.).

The device or devices performing speech recognition processing may include an acoustic front end (AFE) 1256 and a speech recognition engine 1258. The acoustic front end (AFE) 1256 transforms the audio data from the microphone into data for processing by the speech recognition engine. The speech recognition engine 1258 processes the speech recognition data using acoustic models 1253, language models 1254, and other data models and information for recognizing the speech conveyed in the audio data, for example, determining a best matching and/or highest scoring word sequence corresponding to the input data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for speech recognition processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in the configuration data 390. Alternatively, post front-end processed data (such as feature vectors) may be received by the device executing speech recognition processing from another source besides the internal AFE. For example, the device 861 may process audio data into feature vectors (for example using an on-device AFE 1256) and transmit that information to a server across a network 805 for speech recognition processing. Feature vectors may arrive at the server encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following processing by the runtime speech recognizer 350, the text-based results may be sent to other processing components, which may be local to the device performing speech recognition and/or distributed across the network(s) 805. For example, speech recognition results in the form of a single textual representation of the speech, an N-best list including multiple hypotheses and respective scores, lattice, etc. may be sent to a server, such as server 864, for natural language understanding (NLU) processing, such as conversion of the text into commands for execution, either by the device 861, by the server 864, or by another device (such as a server running a specific application like a search engine, etc.).

The device performing NLU processing 960 (e.g., server 864) may include various components, including potentially dedicated processor(s), memory, storage, etc. As shown in FIG. 10, an NLU component 960 may include a named entity recognition (NER) module 1262 which is used to identify portions of query text that correspond to a named entity that may be recognizable by the system. A downstream process called named entity resolution actually links a text portion to an actual specific entity known to the system. To perform named entity resolution, the system may utilize gazetteer information stored in NLU data 1970. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from speech recognizer 350 on the utterance input audio) and attempts to make a semantic interpretation of the text. That is, the NLU process determines the meaning behind the text based on the individual words and then implements that meaning. NLU processing 960 interprets a text string to derive an intent or a desired action from the user as well as the pertinent pieces of information in the text that allow a device (e.g., device 861) to complete that action. For example, if a spoken utterance is processed using recognizer 350 and outputs the text "call mom" the NLU process may determine that the user intended to activate a telephone in his/her device and to initiate a call with a contact matching the entity "mom" (which may involve a downstream command processor 970 linked with a telephone application).

The NLU may process several textual inputs related to the same utterance. For example, if the recognizer 350 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 1272.

To correctly perform NLU processing of speech input, an NLU process 960 may be configured to determine a "domain" (also referred to as the "skill") of the utterance so as to determine and narrow down which services offered by the endpoint device (e.g., server 864 or device 861) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NER module 1262 may begin by identifying potential domains that may relate to the received query. The NLU data 1290 includes a databases of devices identifying domains associated with specific devices. For example, the device 861 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing module 960, a domain may represent a discrete set of activities having a common theme, such as "shopping", "music", "calendaring", etc. As such, each domain may be associated with a particular language model and/or grammar database in a linguistic grammar storage 1276, a particular set of intents/actions in a skill and intent models storage 1278, and a particular personalized lexicon. Each gazetteer may include domain-indexed lexical information associated with a particular user and/or device. For example, a Gazetteer A includes domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing 960, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 1264 processes the query to determine an intent or intents for each identified domain, where the intent corresponds to the action to be performed that is responsive to the query. Each domain is associated with an intents classifier that generally processes text output from the speech recognizer to identify or score possible intents expressed in the input data. In some examples, the intent classifier uses a database of words linked to intents, while in other examples, a neural network based classifier maps input words to output scores for various intents. For example, a music intent database may link words and phrases such as "quiet," "volume off," and "mute" to a "mute" intent.

In order to generate a particular interpreted response, the NER 1262 applies the grammar models and lexical information associated with the respective domain to actually recognize a mention one or more entities in the text of the query. In this manner the NER 1262 identifies "slots" (i.e., particular words in query text) that may be needed for later command processing. Depending on the complexity of the NER 1262, it may also label each slot with a type of varying levels of specificity (such as noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC module 1264 are linked to domain-specific grammar frameworks with "slots" or "fields" to be filled. Each slot/field corresponds to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 1264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 1262 may search the database of generic words associated with the domain. So for instance, if the query was "play songs by the rolling stones," after failing to determine an album name or song name called "songs" by "the rolling stones," the NER component 1262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type}SONG, and {song title} "mother's little helper." As another example, "play songs by the rolling stones" might produce: {domain} Music, {intent} Play Music, {artist name}"rolling stones," and {media type} SONG.

The output from the NLU processing (which may include tagged text, commands, etc.) may then be sent to a command processor 970, which may be located on a same or separate server 864. The destination command processor 970 may be determined based on the NLU output. For example, if the NLU output includes a command to play music, the destination command processor 970 may be a music playing application, such as one located on device 861 or in a music playing appliance, configured to execute a music playing command. If the NLU output includes a search request, the destination command processor 970 may include a search engine processor, such as one located on a search server, configured to execute a search command.

In FIG. 10, a single NLU module 960 is shown. In some embodiments, referred to as a multi-domain architecture, multiple separate NLU modules 960 are present, with each domain being associated with a corresponding NLU module 960. In the multi-domain architecture, each domain (which may include a set of intents and entity slots that define a larger concept such as music, books etc. as well as components such as trained models, etc. used to perform various NLU operations such as NER, IC, or the like) is constructed separately and made available to an NLU component 960 during runtime operations where NLU operations are performed on text (such as text output from a speech recognizer 350). Each domain may have specially configured components to perform various steps of the NLU operations.

In some embodiments, some of the procedures described in this document may be implemented in special purpose circuitry, for example, in an application specific integrated circuit (ASIC) or in a field programmable gate array (FPGA). Such circuitry may perform some computationally intensive aspects, for example, the processing of the ANN 170 of the runtime speech recognizer 350. In some embodiments, multiple processor cores and other related circuitry are integrated into a single integrated circuit that implements some or all of the functions of the runtime configuration.

Although the runtime speech recognizer 350 and the ANN configurator 310 are described separately above, in some embodiments they are both hosted on a runtime system. For example, the ANN configurator may be used to update (adapt) the ANN weights locally in response to collecting further acoustic data. Therefore, the configuration of systems shown in FIGS. 7-8 is only an example, of how various functions may be divided between different systems. More generally, the various functions described above may be partitioned on computers and/or dedicated electronic devices differently than as described in specific examples above. Similarly, certain functions may be split between devices, for example, with the ANN evaluation at runtime being performed on a server computer, which may be specially configured or may have special circuitry for high speed evaluation of ANNs.

It is to be understood that the foregoing description is intended to illustrate and not to limit the scope of the invention, which is defined by the scope of the appended claims. Other embodiments are within the scope of the following claims.

What is claimed is:

1. A method for processing input data using an electronic artificial neural network (ANN) that comprises a plurality of rectifier units, each rectifier unit implementing a rectifier function that produce zero output with negative input, the rectifier units being arranged into one or more layers of the ANN, the method comprising:
   initializing a plurality of weights of the ANN to corresponding initial values, the weights representing multipliers for weighted combinations of values in the ANN for application as inputs to the rectifier functions in the ANN, the initial values being selected to yield an initial average initial distribution for the weighted combinations of values for application as inputs to the rectifier functions, the initial average initial distribution limiting an expected number of negative inputs to the rectifiers to fewer than 7% of representative data used for determination of the values of the plurality of weights,
   wherein the representative data comprises a plurality of input-output pairs, the inputs of the representative data corresponding to the input data to be processed,
   wherein initializing the plurality of weights includes, for each layer of the one or more layers of the ANN, determining a scale factor for the weights, the scale factor characterizing an average range of the weights for the layer, and determining weights of the layer using a random selection approach consistent with the scale factor;
   iteratively updating the values of weights in a plurality of iterations to yield corresponding final values, including at each iteration incrementally updating the weights using corresponding step sizes, the step sizes being determined based on the scale factors for the one or more layers, and sensitivity of an objective function to changes in said weights;
   configuring an ANN in an electronic device with the final values of the weights of the ANN to yield a configured ANN; and
   acquiring the input data, and processing the input data using the configured ANN in the electronic device, including computing one or more output values from a plurality of input values, each output value being determined from at least some of the input values and at least some of the final values of weights of the configured ANN,
   wherein the configured ANN has a property that in operation, on average over input data processed using the ANN, greater than 40% of the rectifier functions of the ANN have positive inputs.

2. The method of claim 1 wherein the input processed using the configured ANN represents acoustic data, and wherein the method further includes using a result of the processing of the input using the configured ANN to perform speech recognition and/or natural language processing of the acoustic data.

3. The method of claim 1 wherein determining the scale factor for the weights of a layer includes selecting the scale factor to yield a target variance of the initial average initial distribution for the weighted combinations for rectifier functions of that layer.

4. A method for processing input data in an electronic device using an artificial neural network (ANN) that comprises a plurality of rectifier units that implement rectifier functions that produce zero output with negative input, the method comprising:
   configuring weights of the ANN with a plurality of configured values to form a configured ANN, the weights representing multipliers for weighted combinations of values in the ANN for application as input values to the rectifier functions, the configured values yielding, on average over the input data processed using the ANN, greater than 40% of the rectifier functions of the ANN having positive inputs; and
   acquiring the input data; and
   processing the input data using the configured ANN in the electronic device, including computing one or more output values from a plurality of input values, each output value being determined from at least some of the input values and at least some of the weights of the configured ANN.

5. The method of claim 4 wherein the ANN comprises a network of units forming paths between inputs and outputs of the ANN, at least some of the units being the rectifier units, the weights being associated with links of the network linking units of the network.

6. The method of claim 5 wherein computing the one or more outputs includes computing values along links of at least one path from an input to an output of the network.

7. The method of claim 4 wherein the rectifier units are arranged into a plurality of layers forming a Deep Neural Network (DNN) wherein outputs of units of a first layer of the plurality of layers are inputs to units of a second layer, and input of units of the first layer are outputs of units of a third layer.

8. The method of claim 4 wherein the input data includes acoustic data representing an acoustic signal, and wherein the method further includes using a result of the processing of the input data to perform one or more of speech recognition or natural language processing of the acoustic data.

9. The method of claim 8 wherein the processing of the input data comprises processing input data representing a part of an acoustic signal to compute one or more outputs, each output corresponding to a different subword unit, and using the result of the processing includes performing a speech recognition procedure using the outputs for successive parts of the acoustic signal.

10. The method of claim 4 wherein the weights of the ANN are determined according to an iterative procedure in which initial values of the weights are determined such that substantially fewer than half of the rectifier functions of the ANN have negative inputs on a representative data set that is representative of the input data.

11. The method of claim 10 wherein the initial values of the weights are determined such that fewer than 7% of the rectifier functions of the ANN have negative inputs on a representative data set that is representative of the input data.

12. The method of claim 10 wherein substantially fewer of the rectifier functions of the ANN have negative inputs than would be obtained using weights for the ANN determined according to an iterative procedure in which initial values of the weights are determined such that substantially half of the rectifier functions of the ANN have negative inputs on the representative data set.

13. The method of claim 4 wherein the values of the weights of the ANN represent a local optimum for the weights according to an objective function evaluated on a data set that is representative of the input data.

14. The method of claim 13 wherein a region of values of weights that converges to the values of the weights of the ANN representing the local optimum includes a set for weights for which fewer than 7% of the rectifier functions of the ANN have negative inputs on the representative data set.

15. A method for configuring an electronic artificial neural network (ANN) that comprises a plurality of rectifier units, each rectifier unit implementing a rectifier function that produce zero output with negative input, the rectifier units being arranged into one or more layers of the ANN, the method comprising:
initializing a plurality of weights of the ANN to corresponding initial values, the weights representing multipliers for weighted combinations of values in the ANN for application as inputs to rectifier functions in the ANN, the initial values being selected by a computer-implemented procedure to yield an initial average initial distribution for the weighted combinations of values for application as inputs to the rectifier functions, the initial average initial distribution limiting negative inputs to the rectifiers to fewer than 7% of representative data used for determination of the values of the plurality of weights.

16. The method of claim 15 wherein the ANN includes a plurality of layers forming a Deep Neural Network (DNN).

17. The method of claim 15 wherein initializing the plurality of weights includes, for each layer of the one or more layers of the ANN, determining a scale factor for the weights, the scale factor characterizing an average range of the weights for the layer, and determining weights of the layer using a random selection approach consistent with the scale factor.

18. The method of claim 17 further comprising:
iteratively updating the values of weights in a plurality of iterations to yield corresponding final values, including at each iteration incrementally updating the weights using corresponding step sizes, the step sizes being determined based on the scale factors for the one or more layers, and sensitivity of an objective function to changes in said weights.

19. The method of claim 18 where the steps of initializing weights and iteratively updating the values of the weights are repeated such that the iteratively updating of values of weights is performed between the initializing of weights of successive layers.

20. The method of claim 18 where the steps of initializing weights is repeated for multiple layers prior to the iteratively updating of the weights.

21. The method of claim 15 wherein the representative data represents acoustic data.

* * * * *